(12) United States Patent
Hoshino et al.

(10) Patent No.: US 9,426,755 B2
(45) Date of Patent: Aug. 23, 2016

(54) TERMINAL DEVICE, BASE STATION DEVICE, TRANSMISSION METHOD AND TRANSMIT POWER SETTING METHOD

(75) Inventors: Masayuki Hoshino, Kanagawa (JP); Akihiko Nishio, Osaka (JP); Takashi Iwai, Ishikawa (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 85 days.

(21) Appl. No.: 14/126,233

(22) PCT Filed: Jun. 15, 2012

(86) PCT No.: PCT/JP2012/003926
§ 371 (c)(1),
(2), (4) Date: Dec. 13, 2013

(87) PCT Pub. No.: WO2013/001737
PCT Pub. Date: Jan. 3, 2013

(65) Prior Publication Data
US 2014/0105110 A1     Apr. 17, 2014

(30) Foreign Application Priority Data

Jun. 29, 2011   (JP) .................................. 2011-144111

(51) Int. Cl.
*H04W 52/18*  (2009.01)
*H04W 52/32*  (2009.01)
*H04W 52/50*  (2009.01)
*H04W 52/40*  (2009.01)
*H04L 5/00*   (2006.01)

(52) U.S. Cl.
CPC ............. *H04W 52/18* (2013.01); *H04L 5/0048* (2013.01); *H04W 52/325* (2013.01); *H04L 5/0007* (2013.01); *H04W 52/40* (2013.01); *H04W 52/50* (2013.01)

(58) Field of Classification Search
None
See application file for complete search history.

(56) References Cited

U.S. PATENT DOCUMENTS

| 2011/0098054 A1* | 4/2011  | Gorokhov et al. ......... 455/452.1 |
| 2011/0250899 A1* | 10/2011 | Vajapeyam et al. ........... 455/450 |
| 2012/0282970 A1* | 11/2012 | Kela et al. ..................... 455/522 |

OTHER PUBLICATIONS

3GPP TS 36.213 version 8.8.0 Release 8, Evolved Universal Terrestrial Radio Access; Physical layer procedures, Oct. 2009.

(Continued)

*Primary Examiner* — Christopher Crutchfield
*Assistant Examiner* — Alan Lindenbaum
(74) *Attorney, Agent, or Firm* — Pearne & Gordon LLP

(57) ABSTRACT

The objective of the present invention is to provide a terminal device capable of suppressing delay in switching between transmit/receive points, and of reliably switching between the transmit/receive points. In the device, a reception processing unit (203) receives control information including a transmission request for an A-SRS and a report request for a downlink CSI, whereupon a transmission signal formation unit (207) transmits the A-SRS at a transmission power set on the basis of the report request. In addition, if a report for each downlink CSI between a plurality of base stations is requested in the report request, the transmission signal formation unit (207) transmits the A-SRS at a first transmission power, whereas if a report for a downlink CSI between a single cell is requested in the report request, the A-SRS is transmitted at a second transmission power. The first transmission power is greater than the second transmission power.

9 Claims, 9 Drawing Sheets

(56) References Cited

OTHER PUBLICATIONS

3GPP TSG RAN WG1 Meeting #62bis, R1-105439, NTT DoCoMo, Views on Signaling for Dynamic Aperiodic SRS, Xian, China, Oct. 11-15, 2010.

3GPP TSG-RAN1#65 Meeting, R1-111469, Samsung, Discussions on CSI-RS port selection for non-uniform networks with low-power nodes, Barcelona, Spain, May 9-13, 2011.

3GPP TSG-RAN1#65 Meeting, R1-111455, Samsung, Simultaneous SRS transmissions in more than one CC, Barcelona, Spain, May 9-13, 2011.

3GPP TSG RAN1#65, R1-111646, Pantech, Remaining issues on Aperiodic SRS triggering, Barcelona, Spain, May 9-13, 2011.

International Search Report for Application No. PCT/JP2012/003926 dated Sep. 18, 2012.

\* cited by examiner

TERMINAL DEVICE, BASE STATION DEVICE, TRANSMISSION METHOD AND TRANSMIT POWER SETTING METHOD

TECHNICAL FIELD

The present invention relates to a terminal apparatus, a base station apparatus, a transmission method, and a transmission power setting method.

BACKGROUND ART

The 3rd Generation Partnership Project Radio Access Network Long Term Evolution (hereinafter, referred to as LTE) (3GPP-LTE) employs orthogonal frequency division multiple access (OFDMA) for the downlink communication scheme and single carrier frequency division multiple access (SC-FDMA) for the uplink communication scheme. In addition, periodic sounding reference signals (P-SRS) are used in the uplink of LTE as reference signals for measuring uplink reception quality.

In LTE, in order to transmit a P-SRS from a terminal to a base station, an SRS transmission subframe which is common to all terminals (hereinafter, referred to as common SRS subframe) is configured. This common SRS subframe is defined by a combination of a predetermined periodicity and a subframe offset on a per-cell basis. In addition, the information on the common SRS subframe is broadcasted to terminals within the cell. For example, when the periodicity is equal to 10 subframes and the offset is 3, the third subframe in a frame (consisting of 10 subframes) is configured as a common SRS subframe. In a common SRS subframe, all the terminals within the cell stop transmission of data signals in the last SC-FDMA symbol of the subframe and use the period as the resources for transmission of the SRS (reference signals).

Meanwhile, subframes for SRS transmissions are individually configured for terminals by a higher layer (i.e., RRC layer higher than the physical layer) (hereinafter, referred to as individual SRS subframe). Each terminal transmits a P-SRS in the configured individual SRS subframe. In addition, parameters for SRS resources (hereinafter, may be referred to as "SRS resource parameters") are configured and indicated to each terminal. The parameters for the SRS resources include the bandwidth, bandwidth position (or SRS frequency domain starting position), cyclic shift, and comb (corresponding to identification information on the subcarrier group) of the SRS, for example. The terminal transmits SRS using the resources specified by the indicated parameters. Additionally, SRS frequency-hopping may be configured.

In addition, the uplink of LTE supports only terminals including one antenna port. For example, as disclosed in NPL 1, transmission power $P_{SRS}(i)$ of the SRS in an i-th subframe is calculated according to the following Equation 1.

[1]

$$P_{SRS}(i)=\min\{P_{CMAX}, P_{SRS\_OFFSET}+10\log_{10}(M_{SRS})+P_{O\_PUSCH}+\alpha \cdot PL+f(i)\}$$ (Equation 1)

In Equation (1), $P_{CMAX}$ [dBm] indicates the maximum transmission power of a terminal, $P_{SRS\_OFFSET}$ [dBm] indicates an offset value (parameter set from the base station) for the transmission power of PUSCH transmitted by the terminal, $M_{SRS}$ indicates the number of frequency resource blocks assigned to the P-SRS, $P_{O\_PUSCH}$ [dBm] indicates an initial value (parameter set from the base station) of the transmission power of PUSCH, PL indicates a path loss level [dB] measured by the terminal, $\alpha$ indicates a weighting coefficient (parameter set from the base station) indicating the compensation ratio of the path loss (PL), and f(i) indicates a cumulative total value in the i-th subframe including past values of transmission power control (TPC) command (control value; for example, 3 dB, +1 dB, 0 dB, and −1 dB) subjected to closed loop control.

Similarly, transmission power $P_{PUCCH}(i)$ and $P_{PUSCH}(i)$ for the uplink control channel (PUCCH) and the uplink data signal (PUSCH) in the i-th subframe are calculated according to the following Equations 2 and 3, respectively.

[2]

$$P_{PUCCH}(i)=\min\{P_{CMAX}, P_{O\_PUCCH}+PL+h(n_{CQI},n_{HARQ})+\Delta_{F\_PUCCH}(F)+g(i)\}$$ (Equation 2)

[3]

$$P_{PUSCH}(i)=\min\{P_{CMAX}, 10\log_{10}(M_{PUSCH}(i))+P_{O\_PUSCH}(j)+\alpha(j) \cdot PL+\Delta_{TF}(i)+f(i)\}$$ (Equation 3)

In Equation 2, $P_{O\_PUCCH}$ [dBm] indicates an initial value (parameter set from the base station) of the transmission power of PUCCH, $h(n_{CQI}, n_{HARQ})$ and $\Delta_{F\_PUCCH}(F)$ indicate parameters set according to the format type of PUCCH, the number of bits, and the like, and g(i) indicates a cumulative total value in the i-th subframe including the past values of TPC command subjected to closed loop control similar to f(i) of Equation 1. In addition, in Equation 3, $M_{PUSCH}(i)$ indicates the number of frequency resource blocks of PUSCH assigned in the i-th subframe, and $P_{O\_PUSCH}(j)$ [dBm] and $\alpha(j)$ indicate an initial value of the transmission power of PUSCH and a weighting coefficient indicating the compensation ratio of path loss (PL), respectively, and are parameters set individually by the base station according to the type of semi-static assignment (j=0) and dynamic assignment (j=1). $\Delta_{TF}(i)$ indicates an offset value that can be set according to the amount of control information when control information is transmitted using PUSCH.

In addition, in the uplink of LTE-Advanced, which is an advanced version of LTE (hereinafter, referred to as "LTE-A"), aperiodic SRS (hereinafter, referred to as A-SRS) is used in addition to P-SRS introduced in LTE. The transmission timing of A-SRS is controlled by trigger information (e.g., 1-bit information). This trigger information is transmitted to a terminal from a base station on a physical layer control channel (i.e., PDCCH) (e.g., see NPL 2). To put it more specifically, the terminal transmits A-SRS only upon request for A-SRS transmission made by the trigger information (i.e., A-SRS transmission request). In addition, there has been discussion on defining, as the transmission timing of A-SRS, the first common SRS subframe located after the fourth subframe from the subframe in which the trigger information has been transmitted. As described above, while terminals transmit P-SRS, periodically, terminals are allowed to transmit A-SRS in a concentrated manner within a short period only when uplink data transmissions occur in bursts, for example (e.g., see FIG. 1).

Moreover, LTE-A has control information formats for various types of data assignment indication. The control information formats in the downlink include: DCI format 1A for allocation of resource blocks consecutive in number (Virtual RBs or Physical RBs); DCI format 1, which allows allocation of RBs not consecutive in number (hereinafter, referred to as "non-contiguous bandwidth allocation"); DCI formats 2, 2A, 2B, and 2C for assigning a spatial-multiplexing MIMO transmission; a downlink assignment control information format for assigning a beam-forming transmission ("beam-forming assignment downlink format": DCI format 1B); and a downlink assignment control information format for assigning a multi-user MIMO transmission ("multi-user MIMO assignment downlink format": DCI format 1D). Meanwhile, the uplink assignment formats include DCI format 0 for assigning a single antenna port transmission and DCI format 4 for assigning an uplink spatial-multiplexing MIMO transmission. DCI format 4 is used for only terminals in which uplink spatial-multiplexing MIMO transmission is configured.

In addition, DCI format 0 and DCI format 1A are adjusted in size by padding so that each format consists of the same number of bits. DCI format 0 and DCI format 1A are also called DCI format 0/1A in some cases. DCI formats 1, 2, 2A, 2B, 2C, 1B and 1D are used in accordance with downlink transmission modes configured in each terminal (i.e., non-contiguous bandwidth allocation, spatial-multiplexing MIMO transmission, beam-forming transmission and multi-user MIMO transmission) and are formats to be configured in each terminal. Meanwhile, DCI format 0/1A can be used independently of the transmission modes and thus can be used for terminals in any transmission mode, i.e., DCI format 0/1A is a format commonly usable in all terminals. In addition, when DCI format 0/1A is used, single-antenna transmission or transmit diversity is used as the default transmission mode.

Terminals receive DCI format 0/1A and the DCI formats that are dependent on the downlink transmission modes. In addition, terminals in which uplink spatial-multiplexing MIMO transmission is configured receive DCI format 4 in addition to the DCI formats mentioned above.

In this respect, using DCI format 0 for indicating the trigger information for A-SRS has been discussed. DCI format 0 is a control information format used in indicating uplink data (PUSCH) assignment. The field for indicating the trigger for A-SRS is added to DCI format 0 in addition to RB indication field, MCS indication field, HARQ information indication field, transmission power control command indication field, and terminal ID field. It should be noted that A-SRS and P-SRS can be used together or singly. In addition, parameters for SRS resources (e.g., transmission bandwidth, cyclic shift, and/or the like) are configured independently for A-SRS and P-SRS.

In addition, there is a heterogeneous network using a plurality of base stations having coverage areas different in size. The heterogeneous network is a network in which a macro base station that covers a large coverage area (called a "macrocell" or "Macro eNB" in some cases) and a pico base station that covers a small coverage area (called a "picocell" or "Low Power Node (LPN)" in some cases) are used together. A method has been discussed by which transfer control (handover) is easily realized using the signal of the physical layer by giving the same identification number (cell ID) as a macrocell to a picocell disposed in the coverage area of the macrocell in the heterogeneous network. In the operation of such a heterogeneous network, a method of selecting optimal transmission and reception points from a plurality of cells according to the propagation conditions between a terminal and each cell has been discussed (for example, refer to FIG. 2 and NPL 3). As a signal that can be a candidate as an index for selection of transmission and reception points, there is a reference signal (for example, P-SRS and A-SRS) for uplink channel quality measurement from a terminal toward a base station.

CITATION LIST

Non-Patent Literature

NPL 1
3GPP TS36.213V8.8.0 (Section 5.1), "3GPP TSGRAN E-UTRA Physical layer procedures (Release 8)", September 2009

NPL 2
3GPP TSG RAN WG1 meeting, R1-105439, "Views on Signaling for Dynamic Aperiodic SRS", October 2010

NPL 3
3GPP TSG RAN WG1 meeting, R1-111469, Samsung, "Discussions on CSI-RS port selection for non-uniform networks with low-power nodes", May 2011

SUMMARY OF INVENTION

Technical Problem

When the transfer control in the physical layer described above and transmission power control of the uplink signal are simply combined, the following problems occur.

In the heterogeneous network in which transfer control in the physical layer is assumed, a macro terminal (Macro UE) belonging to the macrocell and a pico terminal (LPN UE) belonging to the picocell need to be served by using the same cell ID. For this reason, selective use of resources of the macro terminal and the pico terminal mainly in the frequency domain resources (making them orthogonal to each other) (refer to FIG. 3) is used to serve, without any interference with each other, a macro terminal which is likely to use large transmission power due to large distance attenuation and a pico terminal for which low transmission power can be set because of small distance attenuation. For example, in FIG. 3, different resources in the frequency domain are used in macro UE and LPN UE, and resources in the frequency domain are shared between a plurality of LPN UEs (terminals belonging to LPN1 and LPN2).

In this case, reducing the transmission power of the pico terminal (LPN UE) makes uplink signals less likely to interfere with each other between pico terminals belonging to different picocells. Accordingly, the resources in the frequency domain between a plurality of picocells (refer to FIG. 3) can be reused. That is, the transmission power control of the uplink signals described above control the transmission power of uplink signals for picocells, which makes possible a situation where the uplink signal from a pico terminal reaches only the picocell to which the pico terminal belongs.

Meanwhile, since the transfer control in the physical layer is assumed herein, channel quality obtained in other picocells or macrocells for a pico terminal belonging to a certain picocell is not known. Accordingly, there is a problem in that the optimal transmission and reception points cannot be selected.

This problem will be described in more detail from the viewpoint of transmission power control.

For example, a case will be described in which a terminal belonging to a picocell (LPN1) shown in FIG. 3 moves out of the coverage area of the LPN1. In this case, it is preferable for the terminal to belong to a macrocell (Macro eNB) by switching of the transmission and reception points.

The terminal at the boundary of LPN1 shown in FIG. 3 transmits an uplink signal with low transmission power for LPN1 to which the terminal belongs. However, with the transmission power of the uplink signal transmitted from the terminal belonging to LPN1 shown in FIG. 3, the uplink signal may not reach the macro base station (Macro eNB). In this situation, the macrocell (Macro eNB) or another picocell (LPN2) cannot sufficiently obtain the reception quality of SRS transmitted from the terminal belonging to LPN1. Accordingly, the macrocell (Macro eNB) cannot know the communication situation of the terminal belonging to LPN1 (that is, reception quality between the terminal belonging to LPN1 and each cell (transmission and reception points) other than LPN1). As a result, it is not possible to perform switching between transmission and reception points of the terminal belonging to LPN1.

In addition, the control values of the TPC command that are available for the uplink signal are (+3 dB, +1 dB, 0 dB, −1 dB). That is, the TPC command allows controlling of the transmission power of the uplink signal to be controlled only within a narrow width. For this reason, in order to ensure the reception quality of SRS in the macrocell or another picocell (LPN2) by increasing the transmission power of the terminal belonging to LPN1 shown in FIG. 3, closed loop control needs to be repeated many times. The resources used by the corresponding terminal while the closed loop control is repeated are still the resources corresponding to LPN1. Meanwhile, the terminal moves out of the coverage area of LPN1 and approaches LPN2. Transmitting an SRS or an uplink data signal (PUSCH) from the terminal in this situation causes interference with respect to LPN2 that spatially reuses the same resources as those used by the terminal. That is, interference with respect to another LPN excluding the LPN to which the terminal belongs continuously occurs while the closed loop control is repeated (in a time domain).

In addition, in FIG. 3, when the terminal belonging to LPN1 moves out of the coverage area of LPN1 without switching of transmission and reception points, quality degradation of the uplink signal from the terminal increases due to the increase in the distance between LPN1 and the terminal. For this reason, since the terminal repeats the retransmission of the uplink signal, interference continuously occurs, by the amount of retransmission, with respect to LPN2 which spatially reuses the same resources as the resources used by the terminal.

Thus, when the switching of transmission and reception points is delayed in transfer control, interference occurs in the resources of SRS or PUSCH reused between LPNs.

It is an object of the present invention to provide a terminal apparatus, a base station apparatus, a transmission method, and a transmission power setting method each making it possible to avoid delays in switching between the transmission and reception points and to reliably perform switching between the transmission and reception points.

Solution to Problem

A terminal apparatus according to an aspect of the present invention includes: a receiving section that receives a request for reporting of downlink channel information, and control information including a request for transmission of a sounding reference signal (SRS); and a transmitting section that transmits the SRS with transmission power that is set based on the reporting request, in which: the transmitting section transmits the SRS with first transmission power when the reporting request indicates a request for reporting of downlink channel information between the terminal apparatus and each of a plurality of base stations, and the transmitting section transmits the SRS with second transmission power when the reporting request indicates a request for reporting of downlink channel information between the terminal apparatus and a single base station; and the first transmission power is larger than the second transmission power.

A base station apparatus according to an aspect of the present invention includes: a transmitting section that transmits, to a terminal apparatus, a request for reporting of downlink channel information, and control information including a request for transmission of a sounding reference signal (SRS); and a receiving section that receives the SRS transmitted with transmission power that is set based on the reporting request, in which: first transmission power is set for the SRS when the reporting request indicates a request for reporting of downlink channel information between the terminal apparatus and each of a plurality of base stations, and second transmission power is set for the SRS when the reporting request indicates a request for reporting of downlink channel information between the terminal apparatus and a single base station; and the first transmission power is larger than the second transmission power.

A transmission method according to an aspect of the present invention includes: receiving control information including a request for reporting of downlink channel information, and a request for transmission of a sounding reference signal (SRS); and transmitting the SRS with first transmission power when the reporting request indicates a request for reporting of downlink channel information between the terminal apparatus and each of a plurality of base stations, and transmitting the SRS with second transmission power when the reporting request indicates a request for reporting of downlink channel information between the terminal apparatus and a single base station, in which the first transmission power is larger than the second transmission power.

A transmission power setting method according to an aspect of the present invention includes: transmitting, to a terminal apparatus, control information including a request for transmission of a sounding reference signal (SRS) and a request for reporting of downlink channel information; receiving the SRS transmitted with transmission power that is set based on the reporting request; and setting first transmission power for the SRS when the reporting request indicates a request for reporting of downlink channel information between the terminal apparatus and each of a plurality of base stations, and setting second transmission power for the SRS when the reporting request indicates a request for reporting of downlink channel information between the terminal apparatus and a single base station, in which the first transmission power is larger than the second transmission power.

Advantageous Effects of Invention

According to the present invention, it is possible to avoid delays in switching between the transmission and reception points and to reliably perform switching between the transmission and reception points.

DESCRIPTION OF EMBODIMENTS

Figure 1:
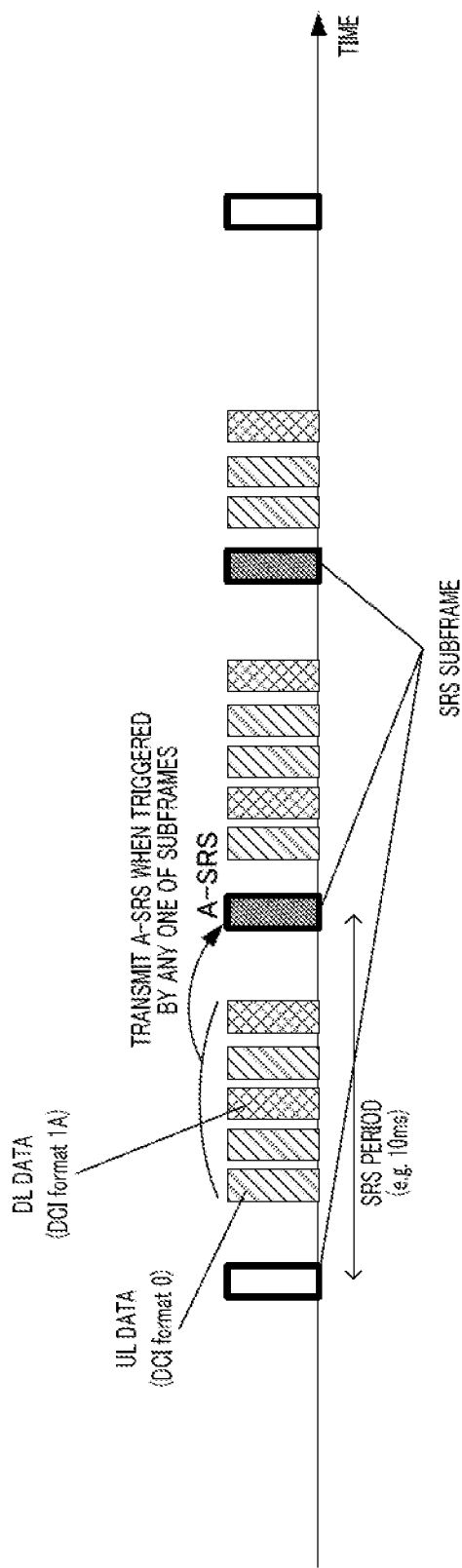
FIG. 1 is a diagram for explaining the transmission timing of A-SRS.
Figure 2:
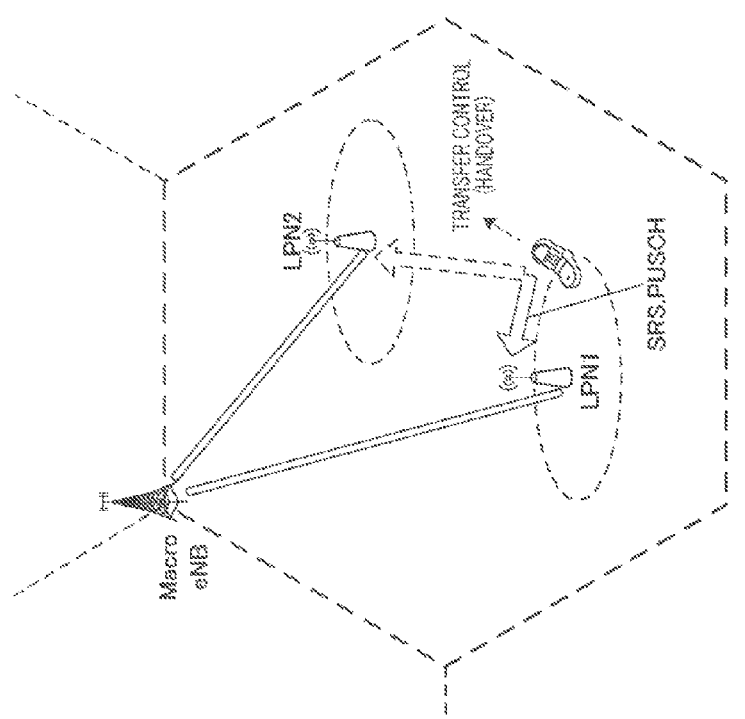
FIG. 2 is a diagram for explaining transfer control in a heterogeneous network.
Figure 3:
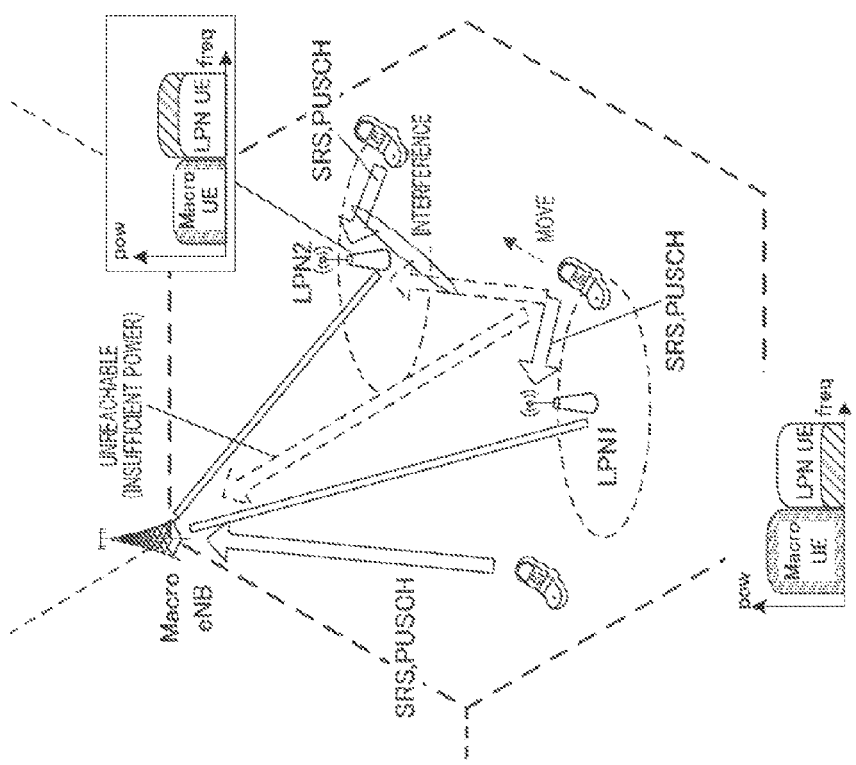
FIG. 3 is a diagram for explaining problems in transfer control and transmission power control.

Hereinafter, embodiments of the present invention will be described in detail with reference to the drawings. Throughout the embodiments, the same elements are assigned the same reference numerals and any duplicate description of the elements is omitted.

Embodiment 1

[Overview of Communication System]

A communication system according to Embodiment 1 of the present invention includes base station 100 and terminals 200. Base station 100 is an LTE-A compliant base station and terminals 200 are LTE-A compliant terminals.

Figure 4:
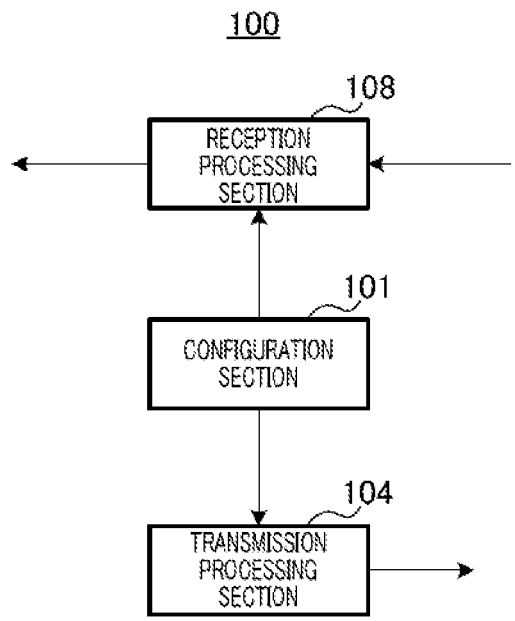
FIG. 4 is a main block diagram of a base station according to Embodiment 1 of the present invention.

FIG. 4 is a main configuration diagram of base station 100 according to Embodiment 1 of the present invention. In base station 100, transmission processing section 104 transmits control information including a request for transmission of sounding reference signals (A-SRS) and a request for reporting downlink channel information (downlink CSI) to terminal 200, and reception processing section 108 receives A-SRS transmitted with transmission power set on the basis of the reporting request. In addition, when the reporting of downlink channel information between a plurality of base stations (cells) and terminal 200 is requested in the reporting request by configuration section 101, first transmission power is set for A-SRS. In addition, when the reporting of downlink channel information between a single base station (cell) and terminal 200 is requested in the reporting request by the configuration section 101, second transmission power is set for A-SRS. Here, the first transmission power is larger than the second transmission power.

Figure 5:
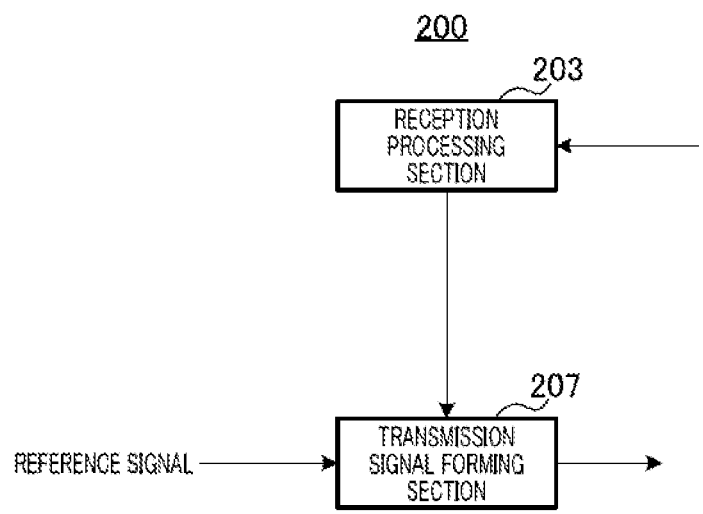
FIG. 5 is a main block diagram of a terminal according to Embodiment 1 of the present invention.

FIG. 5 is a main configuration diagram of terminal 200 according to Embodiment 1 of the present invention. Terminal 200 is a terminal that can perform communication by switching transmission and reception points between a plurality of cells. In terminal 200, reception processing section 203 receives control information including a request for transmission of sounding reference signals (A-SRS) and a request for reporting of downlink channel information (downlink CSI), and transmission signal forming section 207 transmits an A-SRS transmitted with the transmission power set on the basis of the reporting request received by reception processing section 203. Here, transmission signal forming section 207 transmits an A-SRS with first transmission power when the reporting of downlink channel information between a plurality of base stations (cells) and terminal 200 is requested in the reporting request, and transmits A-SRS with second transmission power when the reporting of downlink channel information between a single base station (cell) and terminal 200 is requested in the reporting request. Here, the first transmission power is larger than the second transmission power.

Hereinafter, a description will be provided with an assumption that an FDD system, which separates the uplink and downlink into two frequency bands, is employed.

Hereinafter, a configuration in which a macrocell and a picocell are formed by single base station 100 will be described. However, a configuration in which a macrocell and a picocell are formed by a plurality of base stations 100 and both are operated cooperatively by sharing a signal appropriately, may be adopted without being limited to the above configuration.

[Configuration of Base Station 100]

Figure 6:
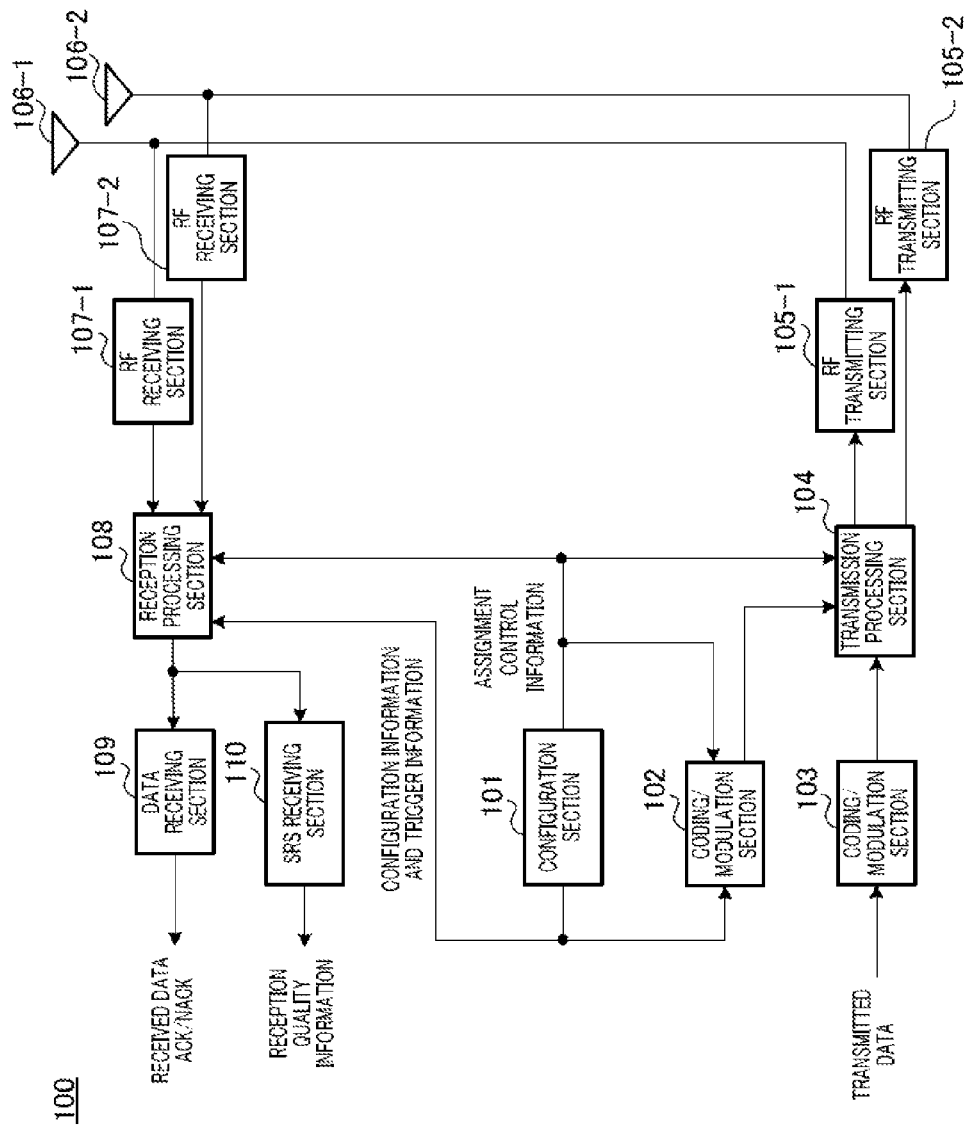
FIG. 6 is a block diagram showing the configuration of the base station according to Embodiment 1 of the present invention.

FIG. 6 is a block diagram illustrating a configuration of base station 100 according to Embodiment 1 of the present invention. In FIG. 6, base station 100 includes configuration section 101, coding and modulation sections 102 and 103, transmission processing section 104, RF (Radio Frequency) transmitting sections 105-1 and 105-2, antennas 106-1 and 106-2, RF (Radio Frequency) receiving sections 107-1 and 107-2, reception processing section 108, data receiving section 109, and SRS receiving section 110.

Configuration section 101 generates "A-SRS transmission rule configuration information" for configuring a correspondence between a control information format (e.g., DCI format) used for transmitting a request for A-SRS to configuration target terminal 200, and resources used for the transmission of A-SRS from configuration target terminal 200 (hereinafter, A-SRS resource). The A-SRS transmission rule setting information includes identification information on a plurality of control information formats (i.e., DCI formats) and information about A-SRS resources corresponding to the identification information on each of the control information formats. These A-SRS resources are resources to which terminal 200 maps A-SRS as described above. The information about A-SRS resources includes parameters such as a frequency bandwidth (or the initial RB position of SRS bandwidth), bandwidth (or the number of RBs), cyclic shift, transmission comb, the number of antennas, the number of transmissions, frequency hopping, and a component carrier. To put it more specifically, based on the A-SRS transmission rule configuration information, combinations each include the identification information on one of the plurality of control information formats (i.e., DCI formats) and the parameters corresponding to the identification information on the control information formats are configured for configuration target terminal 200.

In addition, configuration section 101 generates uplink assignment control information or downlink assignment control information including trigger information instructing (requesting) instruction target terminal 200 to transmit A-SRS (hereinafter, simply referred to as "trigger information").

As described above, the A-SRS transmission rule configuration information generated by configuration section 101 is transmitted to configuration target terminal 200 after the A-SRS transmission rule configuration information undergoes transmission processing performed by coding and modulation section 102, transmission processing section 104, and RF transmitting section 105, as the control information of the RRC layer. In addition, the control information including the trigger information for A-SRS transmission is transmitted to configuration target terminal 200 after the control information undergoes transmission processing performed by coding and modulation section 102, transmission processing section 104, and RF transmitting section 105, as the control information of the layers 1 and 2. The trigger information is represented by a single bit. When the bit is 0, this means that the trigger information indicates the instruction to transmit A-SRS. When the bit is 1, this means that the trigger information indicates no A-SRS transmission.

Configuration section 101 generates assignment control information including resource (i.e., RB) assignment information and MCS information for one or a plurality of transport blocks (TB), as control information including the trigger information. The assignment control information includes assignment control information on uplink resources for assigning uplink data (e.g., physical uplink shared channel (PUSCH)) and downlink resources for assigning downlink data (e.g., physical downlink shared channel (PDSCH)). The assignment control information for assigning uplink data includes DCI formats 0 and 4 and examples of assignment control information for assigning downlink data include DCI formats 1A, 1, 1B, 1D, 2, 2A, 2B, and 2C.

Configuration 101 transmits the A-SRS transmission rule configuration information to configuration target terminal 200 via coding and modulation section 102 and also outputs the A-SRS transmission rule configuration information to reception processing section 108. In addition, configuration section 101 transmits the assignment control information including the trigger information to configuration target terminal 200 via coding and modulation section 102 and also outputs the assignment control information to transmission processing section 104. Moreover, configuration section 101 outputs information indicating the format (i.e., DCI format) of the assignment control information including the trigger information to reception processing section 108.

Base station 100 indicates the configuration information to terminal 200 as higher layer information (i.e., using RRC signaling). Meanwhile, base station 100 indicates the assignment control information and the trigger information to terminal 200 using physical downlink control channel (PD-CCH). To put it more specifically, while the reporting intervals of the configuration information are relatively long (i.e., the configuration information is indicated between relatively long intervals), the indicating intervals of the assignment control information and the trigger information are relatively short (i.e., the assignment control information and the trigger information are indicated between relatively short intervals).

In addition, configuration section 101 transmits a request for reporting of downlink channel information (hereinafter, referred to as downlink CSI reporting or called downlink CSI feedback in some cases) to terminal 200, which is to be subjected to transfer control in a physical layer in the heterogeneous network described above, the reporting being based on measurement for a downlink channel between each of a plurality of transmission and reception points (a plurality of cells) and the terminal. This indication (that is, a request for reporting of downlink CSI) is transmitted as higher layer information, for example. Alternatively, configuration section 101 may generate uplink assignment control information or downlink assignment control information including an instruction (request) of reporting of downlink CSI. In addition, similar to the SRS, reporting of the downlink CSI can be performed at a periodic timing or at an optional timing based on the trigger information. In addition, as a request for reporting of the downlink CSI, there is a case where the reporting of each downlink CSI between a plurality of cells and terminal 200 is requested (that is, a case where transfer control is performed in the physical layer) and a case where the reporting of downlink CSI between a single cell and terminal 200 is requested (that is, a case where transfer control is not performed in the physical layer).

Coding and modulation section 102 encodes and modulates the configuration information, trigger information, and assignment control information received from configuration section 101 and outputs the obtained modulation signals to transmission processing section 104.

Coding and modulation section 103 encodes and modulates transmission data (data signals) to be received and outputs the obtained modulation signals to transmission processing section 104.

Transmission processing section 104 forms transmission signals by mapping the modulation signals to be received from coding and modulation sections 102 and 103 to the resources indicated by the downlink resource assignment information received from configuration section 101. In a case where the transmission signals are OFDM signals, OFDM signals are formed by mapping the modulation signals to the resources indicated by the downlink resource assignment information to be received from configuration section 101, transforming the mapped signals into a time waveform by inverse fast Fourier transform (IFFT), and adding cyclic prefix (CP) to the resultant signals.

RF transmitting section 105-1 or 105-2 performs radio transmission processing (e.g., up-conversion, digital to analog (D/A) conversion, and/or the like) on the transmission signals received from transmission processing section 104 and transmits the resultant signals via antenna 106-1 or 106-2.

RF receiving section 107-1 and 107-2 perform radio reception processing (e.g., down-conversion, analog to digital (A/D) conversion, and/or the like) on the radio signals received via antenna 106-1 or 106-2 and outputs the obtained received signals to reception processing section 108. In addition, in a plurality of transmission/reception sections and antennas provided in FIG. 6, for example, RF transmitting section 105-1, RF receiving section 107-1, and antenna 106-1 may be used to form a macrocell, and RF transmitting section 105-2, RF receiving section 107-2, and antenna 106-2 may be used to form a picocell.

Reception processing section 108 identifies the resources to which the uplink data signals and ACK/NACK information are mapped, on the basis of the uplink resource assignment information received from configuration section 101 and extracts a signal component mapped to the identified resources from the received signals. In this case, the reception processing section 108 performs synchronous detection and demodulation of the uplink data signal on the assumption that f(i) and $P_{PUSCH}(i)$ in Equation (3) are set according to the TPC control value included in the uplink resource assignment information.

In addition, reception processing section 108 identifies the resources to which A-SRS is mapped, on the basis of transmission rule configuration information, the trigger information of A-SRS, and the DCI format information received from configuration section 101, and extracts a signal component mapped to the identified resources from the received signals. The DCI format information herein is the one used for the instruction to transmit A-SRS. To put it more specifically, reception processing section 108 receives A-SRS on the identified resources described above in the first common SRS subframe located at or after the fourth subframe from the subframe in which the trigger information is transmitted.

In a case where the received signals are spatially multiplexed signals (i.e., multi-codeword (CW) transmission), reception processing section 108 demultiplexes the signals for each CW. In addition, in a case where the received signals are OFDM signals, reception processing section 108 performs an inverse discrete Fourier transform (IDFT) on the extracted signal component to transform the OFDM signals into time-domain signals.

The uplink data signals and ACK/NACK information extracted by reception processing section 108 as described above are outputted to data receiving section 109 while the A-SRS is outputted to SRS receiving section 110.

Data receiving section 109 decodes the signals received from reception processing section 108. The uplink data and ACK/NACK information are thus obtained.

SRS receiving section 110 measures reception quality of each frequency resource on the basis of the A-SRS received from reception processing section 108 and outputs the reception quality information. When a plurality of A-SRSs to be transmitted from different terminals 200 are code-multiplexed using orthogonal sequences and/or the like, SRS receiving section 110 also demultiplexes the code-multiplexed plurality of A-SRSs.

[Configuration of Terminal 200]

Figure 7:
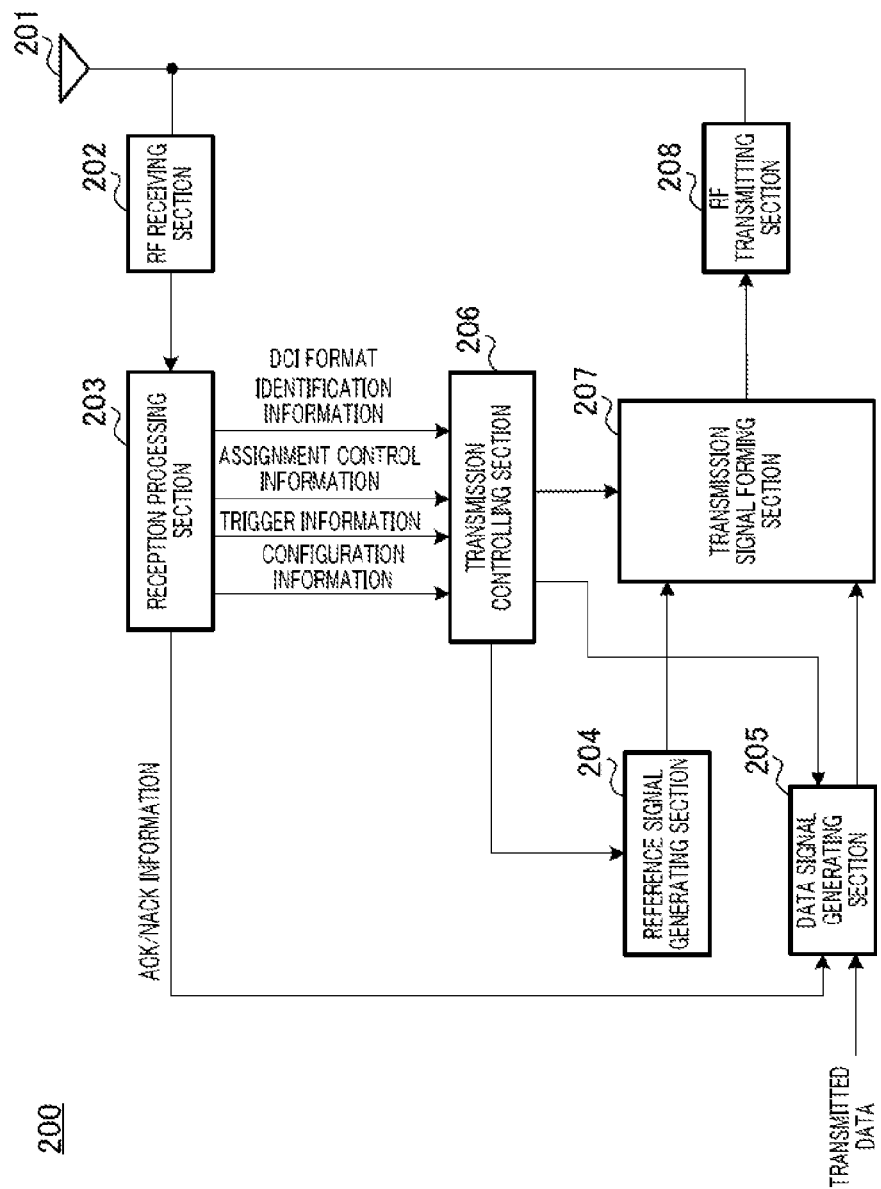
FIG. 7 is a block diagram showing the configuration of the terminal according to Embodiment 1 of the present invention.

FIG. 7 is a block diagram illustrating the configuration of terminal 200 according to Embodiment 1 of the present invention. Terminal 200 herein is an LTE-A compliant terminal.

In FIG. 7, terminal 200 includes antenna 201, RF receiving section 202, reception processing section 203, reference signal generating section 204, data signal generating section 205, transmission controlling section 206, transmission signal forming section 207, and RF transmitting section 208.

RF receiving section 202 performs radio reception processing (e.g., down-conversion, analog to digital (A/D) conversion, and/or the like) on the radio signals received via antenna 201 and outputs the obtained received signals to reception processing section 203.

Reception processing section 203 extracts the configuration information, assignment control information, trigger information, and data signals included in the reception signals. Reception processing section 203 outputs the configuration information, assignment control information, and trigger information to transmission controlling section 206. In addition, reception processing section 203 outputs the format identification information on the DCI from which the trigger information has been extracted to transmission controlling section 206. Moreover, reception processing section 203 performs error detection processing on the extracted data signals and outputs ACK/NACK information in accordance with the result of error detection to data signal generating section 205.

Upon receipt of an instruction to generate reference signals from transmission controlling section 206, reference signal generating section 204 generates and outputs reference signals (A-SRS) to transmission signal forming section 207.

Data signal generating section 205 receives the ACK/NACK information and transmission data and generates data signals by encoding and modulating the ACK/NACK information and transmission data on the basis of MCS information received from transmission controlling section 206. For non-MIMO transmission, data signals are generated using a single codeword (CW) while data signals are generated using two code words for MIMO transmission. It should be noted that data signal generating section 205 also performs CP removal processing and FFT processing when the received signals are OFDM signals.

Transmission controlling section 206 configures "SRS mapping resources," to which terminal 200 maps an A-SRS. More specifically, transmission controlling section 206 identifies the SRS mapping resources on the basis of the configuration information received from reception processing section 203 (i.e., A-SRS transmission rule configuration information) and the format identification information on the DCI from which the trigger information has been extracted.

Transmission controlling section 206 configures the first common SRS subframe located after the fourth subframe from the subframe in which the trigger information is transmitted, as the transmission subframe for A-SRS. Upon receipt of the trigger information, transmission controlling section 206 outputs an instruction to generate the A-SRS to reference signal generating section 204 and also outputs the information about the identified SRS mapping resources described above to transmission signal forming section 207.

In addition, transmission controlling section 206 determines the transmission power of A-SRS on the basis of the request for reporting of downlink CSI when the trigger information of A-SRS is received. Details of the method of determining the transmission power for A-SRS will be described later. In addition, terminal 200 reports the downlink CSI to base station 100 (not shown) in response to the request for reporting of downlink CSI.

Transmission controlling section 206 identifies "data mapping resources", to which data signals are mapped, on the basis of the assignment control information to be received from reception processing section 203. Transmission controlling section 206 outputs information about the data mapping resources (hereinafter, may be referred to as "data mapping resource information") to transmission signal forming section 207 and also outputs MCS information included in the assignment control information to data signal generating section 205.

Transmission signal forming section 207 maps the A-SRS received from reference signal generating section 204 to the SRS mapping resources. In addition, transmission signal forming section 207 maps the data signals received from data signal generating section 205 to the data mapping resources indicated by the data mapping resource information. Transmission signals are generated in the manner described above. It should be noted that, for Non-MIMO transmission, single codeword data signals are assigned to a single layer while two codeword data signals are assigned to a plurality of layers for MIMO transmissions. Meanwhile, when the transmission signals are OFDM signals, transmission signal forming section 207 performs a discrete Fourier transform (DFT) on the data signals and maps the resultant data signals to the data mapping resources. Furthermore, CP is added to the transmission signals thus formed. In addition, transmission signal forming section 207 applies transmission power control according to Equation 3 for a data signal among the transmission signals to which CP is added. In addition, transmission signal forming section 207 applies a transmission power control method determined by transmission controlling section 206 to the SRS and outputs a transmission signal after transmission power control to RF transmitting section 208.

RF transmitting section 208 performs radio transmission processing (e.g., up-conversion, digital to analog (D/A) conversion, and/or the like) on the transmission signal formed by transmission signal forming section 207 and thereafter transmits the processed signals via antenna 201.

(Operations of Base Station 100 and Terminal 200)

A description will be provided regarding operations of base station 100 and terminal 200 respectively including the abovementioned configurations. The description will be provided herein regarding a case where base station 100 uses DCI format 0 as the format of uplink resource assignment control information and also uses DCI format 1A as the format of downlink resource assignment control information.

In base station 100, configuration section 101 configures A-SRS transmission rule configuration information for configuration target terminal 200. In the A-SRS transmission rule configuration information, identification information of the plurality of control information formats (DCI formats) and information about the A-SRS resources corresponding to the identification information of each control information format are associated with each other. In this embodiment, the assumption is made that the plurality of control information formats are DCI format 0 and DCI format 1A. Accordingly, in the rules for A-SRS transmission, for example, the first SRS resources associated with DCI format 0 and the second SRS resources associated with DCI format 1A differ in only cyclic shift among a set of parameters that identify the resources. More specifically, cyclic shift 0 is configured in the SRS resource configuration 1 defining the first SRS resources, while cyclic shift 6 is configured in the SRS resource configuration 2 defining the second SRS resources. It should be noted that, although cyclic shift differs between the first SRS resources and the second SRS resources in this case, the parameter that differs therebetween is not limited to cyclic shift. For example, comb number alone or both comb number and cyclic shift may differ between the first SRS resources and the second SRS resources. Base station 100 indicates the A-SRS transmission rule configuration information to terminal 200 using RRC signaling. For example, the A-SRS transmission rule configuration information is included in a "Sounding RS-UL-Config" message and indicated by the message.

In a situation where use of A-SRS is more appropriate (e.g., situation where a large amount of video data is uploaded in a short period in the uplink), TCP-ACK and/or the like for uplink data occurs in the downlink. For this reason, it is likely that both of the uplink resource assignment control information and the downlink resource assignment control information are transmitted from base station 100 to terminal 200 within the assignment period of common SRS resources (for example, 10 ms). When there is uplink data to be transmitted, the uplink resource assignment control information in DCI format 0 is transmitted, and when there is downlink data to be transmitted, the downlink resource assignment control information in DCI format 1A is transmitted. Although FIG. 1 illustrates, for the purpose of convenience, a case where uplink resource assignment control information and downlink resource assignment control information are transmitted in different subframes, uplink resource assignment control information and downlink resource assignment control information can be transmitted in the same subframe.

Therefore, base station 100 transmits the assignment control information (downlink resource assignment control information or uplink resource assignment control information), which includes trigger information, to terminal 200 within the mapping period (for example, 10 ms) of the common SRS resources, thereby causing terminal 200 to transmit A-SRS in the first common SRS subframe at or after the transmission timing.

In terminal 200, transmission controlling section 206 identifies the SRS mapping resources on the basis of the A-SRS transmission rule configuration information and the format identification information of the DCI in which the trigger information is included. The A-SRS transmission rule configuration information is indicated to terminal 200 from base station 100 in advance and is thus shared between base station 100 and terminal 200.

In addition, transmission controlling section 206 identifies a method of controlling the transmission power of A-SRS on the basis of the indication (request) of downlink CSI reporting transmitted from base station 100 to terminal 200.

Specifically, when it is not indicated to perform downlink CSI reporting for a plurality of transmission and reception points (when it is indicated to perform only downlink CSI reporting for a single transmission and reception point), transmission controlling section 206 applies transmission power control as is according to Equation 1.

Meanwhile, when it is indicated to perform downlink CSI reporting for a plurality of transmission and reception points, transmission controlling section 206 applies a transmission power control method obtained by giving the offset value shown in Equation 4 below for the transmission power control according to Equation 1. That is, in this case, transmission controlling section 206 uses $P'_{O\_PUSCH}$, which is obtained by giving the offset value $P_{boost}$ to $P_{O\_PUSCH}$, instead of $P_{O\_PUSCH}$ shown in Equation 1.

[4]

$$P'_{O\_PUSCH} = P_{O\_PUSCH} + P_{boost} \quad \text{(Equation 4)}$$

Thus, terminal 200 transmits an A-SRS with first transmission power when the reporting of each downlink CSI between a plurality of cells and terminal 200 is requested in the downlink CSI reporting request indicated from base station 100, and transmits an A-SRS with second transmission power when the reporting of downlink CSI between a single cell and terminal 200 is requested in the downlink CSI reporting request. Here, the first transmission power is larger than the second transmission power. Here, the first transmission power is power obtained by increasing the second transmission power by a predetermined value (offset value $P_{boost}$ shown in FIG. 4). In addition, the first transmission power is power set to transmit at least an A-SRS to a macro eNB that covers a macrocell, and the second transmission power is power set to transmit an A-SRS to an LPN that covers a picocell to which terminal 200 belongs.

As described above, according to the present embodiment, base station 100 can set transmission power, which allows an A-SRS to reach the receiving antenna of base station 100 (macrocell), as transmission power of A-SRS when triggering A-SRS transmission for terminal 200 that has been indicated to perform downlink CSI reporting for a plurality of transmission and reception points (that is, transfer control terminal 200) among terminals served by a picocell. Meanwhile, base station 100 can set the transmission power, which allows an A-SRS to reach the receiving antenna of a picocell, as transmission power of A-SRS when triggering A-SRS transmission for terminal 200 that has not been indicated to perform downlink CSI reporting for a plurality of transmission and reception points among terminals served by the picocell.

That is, base station 100 can set the transmission power of A-SRS flexibly according to whether or not terminal 200 is a terminal that has been indicated to perform downlink CSI reporting for a plurality of transmission and reception points. In addition, terminal 200 can appropriately control the transmission power of A-SRS by determining whether or not terminal 200 itself is a terminal that has been indicated to perform downlink CSI reporting for a plurality of transmission and reception points on the basis of the configuration of downlink CSI reporting indicated to terminal 200.

In this manner, it is possible to set the transmission power flexibly in reference signal transmission while avoiding an increase in the number of bits used in the trigger information of reference signal transmission. As a result, the A-SRS transmitted from transfer control target terminal 200 reaches the receiving antenna of the macrocell. In addition, as long as the A-SRS transmitted from transfer control target terminal 200 reaches the macrocell at least, it can be said that the A-SRS also reaches the other picocells disposed in the macrocell. Accordingly, the channel quality can be measured in a macrocell or picocells other than the picocell to which the terminal belongs without influence from a difference in distance attenuation. Thus, it is possible to avoid delays in switching between the transmission and reception points and to reliably perform switching between the transmission and reception points. In addition, it is possible to avoid throughput degradation caused by delays in switching between the transmission and reception points, which would have occurred otherwise.

Embodiment 2

In Embodiment 2, the method of controlling the transmission power of A-SRS is determined according to downlink CSI reporting and the format identification information of DCI.

The operations of base station 100 and terminal 200 according to the present embodiment will be described. Here, a case will be described in which base station 100 uses DCI format 0 as a format of uplink resource assignment control information and uses DCI format 1A as a format of downlink resource assignment control information.

When terminal 200 has been indicated to perform downlink CSI reporting for a plurality of transmission and reception points and the format identification information of DCI including the trigger information of A-SRS indicates DCI format 0, transmission controlling section 206 applies the transmission power control as is according to Equation 1.

Meanwhile, when terminal 200 has been indicated to perform downlink CSI reporting for a plurality of transmission and reception points and the format identification information of DCI including the trigger information of A-SRS indicates DCI format 1A, transmission controlling section 206 applies a transmission power control method obtained by giving the offset value shown in Equation 4 to the transmission power control according to Equation 1.

Thus, terminal 200 transmits an A-SRS with transmission power increased by a predetermined value (that is, transmission power allowing the A-SRS to reach the macrocell) when the reporting of each downlink CSI between a plurality of cells and terminal 200 is requested in the downlink CSI reporting request indicated from base station 100 and the trigger information of A-SRS is included in DCI of DCI format 1A (format for downlink assignment).

That is, base station 100 can set transmission power, which allows an A-SRS to reach the receiving antenna of base station 100 (macrocell), as transmission power of A-SRS when triggering A-SRS transmission for terminal 200 that has been reported to perform downlink CSI reporting for a plurality of transmission and reception points among terminals served by the picocell. That is, base station 100 appropriately selects a format (DCI format) of assignment control information (DCI), which includes the trigger information of A-SRS, for terminal 200 that has been indicated to perform downlink CSI reporting for a plurality of transmission and reception points. In addition, terminal 200 that has been indicated to perform downlink CSI reporting for a plurality of transmission and reception points controls the transmission power of A-SRS so that the A-SRS can reach the receiving antenna of the macrocell when the format identification information of DCI is DCI format 1A (format for downlink assignment).

In this manner, as in Embodiment 1, it is possible to set the transmission power flexibly in reference signal transmission while avoiding an increase in the number of bits used in the trigger information of reference signal transmission. As a result, the channel quality can be measured in the macrocell without any influence from the difference in distance attenuation. Thus, it is possible to avoid delays in switching between the transmission and reception points and to reliably perform switching between the transmission and reception points. In addition, it is possible to avoid the throughput degradation caused by delays in switching between the transmission and reception points, which would have occurred otherwise.

In addition, according to the present embodiment, the transmission power of A-SRS is determined according to whether or not a request for transmission of A-SRS (trigger information) is included at the time of downlink data assignment (for example, DCI format 1A). Meanwhile, at the time of uplink data assignment (for example, DCI format 0), base station 100 can perform, using a TPC command and/or the like, transmission power control optimized for the receiving antenna of the picocell with respect to terminal 200 served by the picocell. That is, base station 100 can increase transmission power so that the A-SRS can reach the receiving antenna of the macrocell while limiting transmission power for terminal 200 so that the uplink data signal (PUSCH) can reach only the picocell to which terminal 200 belongs. That is, according to the present embodiment, transmission power control can be separately applied to the uplink data signal (PUSCH) and A-SRS.

Embodiment 3

In the present embodiment, the method of controlling the transmission power of A-SRS is determined according to whether or not communication with a picocell to which terminal 200 belongs is being performed in addition to the operation of Embodiment 2.

The operations of base station 100 and terminal 200 according to the present embodiment will be described. Here, a case will be described in which base station 100 uses DCI format 0 as a format of uplink resource assignment control information and uses DCI format 1A as a format of downlink resource assignment control information.

When terminal 200 is indicated to perform downlink CSI reporting for a plurality of transmission and reception points and the format identification information of DCI indicates DCI format 0, transmission controlling section 206 determines the method of controlling the transmission power of A-SRS according to whether or not terminal 200 is served by the picocell.

For example, the initial value f(0) of f(i) in Equations 1 and 3 is given by $f(0)=\Delta P_{rampup}+\delta_{msg2}$. The value of $\delta_{msg2}$ is information shared between base station 100 and terminal 200 in a random access procedure. Base station 100 increases the transmission power of the uplink signal from terminal 200 by increasing the value of $\delta_{msg2}$ in the random access procedure for terminal 200 served by the macrocell. Meanwhile, base station 100 keeps the transmission power of the uplink signal from terminal 200 low by decreasing the value of $\delta_{msg2}$ in the random access procedure for terminal 200 accommodated in the picocell. This makes it possible to reuse the resources used by terminal 200, for other terminals served by another picocell in the macrocell.

That is, terminal 200 can determine that terminal 200 itself is served not by the picocell but by the macrocell when the value of $\delta_{msg2}$ is equal to or less than a predetermined threshold value.

Then, transmission controlling section 206 determines the transmission power control of A-SRS according to Equation 5 below.

[5]

$$P'_{O\_PUSCH,c}(j) = \begin{cases} P_{O\_PUSCH,c}(j) + P_{boost} & \text{if } \delta_{msg2} \leq \alpha \\ P_{O\_PUSCH,c}(j) & \text{Otherwise} \end{cases} \quad \text{(Equation 5)}$$

That is, when the value of $\delta_{msg2}$ is equal to or less than the predetermined threshold value (when terminal 200 is determined to be served by the picocell), transmission controlling section 206 uses $P'_{O\_PUSCH}$ obtained by giving the offset value $P_{boost}$ to $P_{O\_PUSCH}$. Meanwhile, when the value of $\delta_{msg2}$ is greater than the predetermined threshold value (when terminal 200 is determined to be not served by the picocell), transmission controlling section 206 uses $P_{O\_PUSCH}$ as is.

Thus, terminal 200 transmits an A-SRS with transmission power increased by a predetermined value (that is, transmission power allowing the A-SRS to reach the macrocell) when the reporting of each downlink CSI between a plurality of cells and terminal 200 is requested in the downlink CSI reporting request indicated from base station 100 and the parameter ($\delta_{msg2}$) for setting the initial value of the normal transmission power (Equations 1 and 3) is equal to or less than the threshold value set in advance.

Therefore, the operation to increase the transmission power of A-SRS when the trigger information of A-SRS is included in the assignment control information of DCI format 1A can be limited to terminal 200 around the picocell (LPN) (terminal 200 served by the picocell). That is, even when the trigger information of A-SRS is included in the assignment control information of DCI format 1A, terminal 200 performs the same transmission power control as in Equation 1 if it is determined that terminal 200 itself is served by the macrocell. Accordingly, when the assignment control information of DCI format 1A is used, it is possible to always prevent A-SRS from being transmitted with large transmission power. As a result, it is possible to keep the frequency of occurrence of interference with the macrocell low.

In addition, as in Embodiment 1, it is possible to flexibly set the transmission power for transmission of a reference signal while avoiding an increase in the number of bits used in the trigger information of transmission of a reference signal. As a result, the channel quality can be measured in the macrocell without any influence from a difference in distance attenuation. Thus, it is possible to avoid delays in switching between the transmission and reception points and to reliably perform switching between the transmission and reception points. In addition, it is possible to avoid throughput degradation caused by delays in switching between the transmission and reception points, which would have occurred otherwise.

In addition, in the present embodiment, as shown in Equation 5, whether or not the value of $\delta_{msg2}$ is equal to or less than the predetermined threshold value, that is, the case where the value of $\delta_{msg2}$ is divided into two stages, has been described. However, the present invention is not limited thereto. For example, Equation 6 below is an example where the value of $\delta_{msg2}$ is divided into four stages.

[6]

$$P'_{O\_PUSCH,c}(j) = \begin{cases} P_{O\_PUSCH,c}(j) + P_{boost1} & \text{if } \delta_{msg2} \le \alpha_1 \\ P_{O\_PUSCH,c}(j) + P_{boost2} & \text{if } \alpha_1 < \delta_{msg2} \le \alpha_2 \\ P_{O\_PUSCH,c}(j) + P_{boost3} & f \alpha_2 < \delta_{msg2} \le \alpha_3 \\ P_{O\_PUSCH,c}(j) & \text{Otherwise,} \end{cases} \quad \text{(Equation 6)}$$

where $P_{boost1} > P_{boost2} > P_{boost3}$

That is, in Equation 6, an increase in transmission power becomes larger as the value of $\delta_{msg2}$ becomes smaller. That is, terminal 200 sets the transmission power control value of A-SRS toward the macrocell by adding an increase ($P_{boost1}$ to $P_{boost3}$) in transmission power corresponding to the value of $\delta_{msg2}$ to the transmission power control value. Accordingly, terminal 200 can transmit an A-SRS by controlling in more detail how much transmission power is required for the macrocell, compared with Equation 5 as well as whether or not terminal 200 itself is served by the picocell.

In addition, in the present embodiment, the case has been described in which whether or not terminal 200 is served by the picocell (whether or not terminal 200 is around the picocell) is determined on the basis of the value of $\delta_{msg2}$. However, the present invention is not limited to this example. For example, whether or not terminal 200 is served by the picocell (whether or not terminal 200 is around the picocell) may be determined on the basis of PHR (Power Headroom=information on transmission power reserve capacity of the terminal). For example, it may be determined that terminal 200 is served by the picocell (terminal 200 is around the picocell) when the PHR is equal to or greater than a predetermined value.

Embodiment 4

The operations of base station 100 and terminal 200 according to the present embodiment will be described. Here, a case will be described in which base station 100 uses DCI format 0 as a format of uplink resource assignment control information and uses DCI format 1A as a format of downlink resource assignment control information.

Base station 100 transmits the assignment control information (downlink resource assignment control information or uplink resource assignment control information), which includes trigger information, to terminal 200 within the mapping period (for example, 10 ms) of the common SRS resources. Accordingly, it is possible to cause terminal 200 to transmit an A-SRS in the first common SRS subframe at or after the transmission timing of the trigger information.

In this case, when terminal 200 is indicated to perform downlink CSI reporting for a plurality of transmission and reception points and the format identification information of DCI including the trigger information of A-SRS indicates DCI format 0, transmission controlling section 206 of terminal 200 determines the method of controlling the transmission power of A-SRS according to whether or not the transmission subframe of uplink transmission data corresponding to the uplink resource assignment control information included in the DCI is the same as the common SRS subframe.

Specifically, when the transmission subframe of the uplink transmission data corresponding to the uplink resource assignment control information included in the DCI (DCI format 0) including trigger information is not the same as the common SRS subframe, transmission controlling section 206 applies the transmission power control according to Equation 3 according to the TPC command included in DCI of DCI format 0.

Meanwhile, when the transmission subframe of the uplink transmission data corresponding to the uplink resource assignment control information included in the DCI (DCI format 0) including trigger information is the same as the common SRS subframe, transmission controlling section 206 applies the transmission power control according to Equation 3 and also applies a transmission power control method, which is obtained by giving the offset value shown in Equation 4 for the transmission power control according to Equation 3, according to the TPC command included in DCI of DCI format 0.

Figure 8:
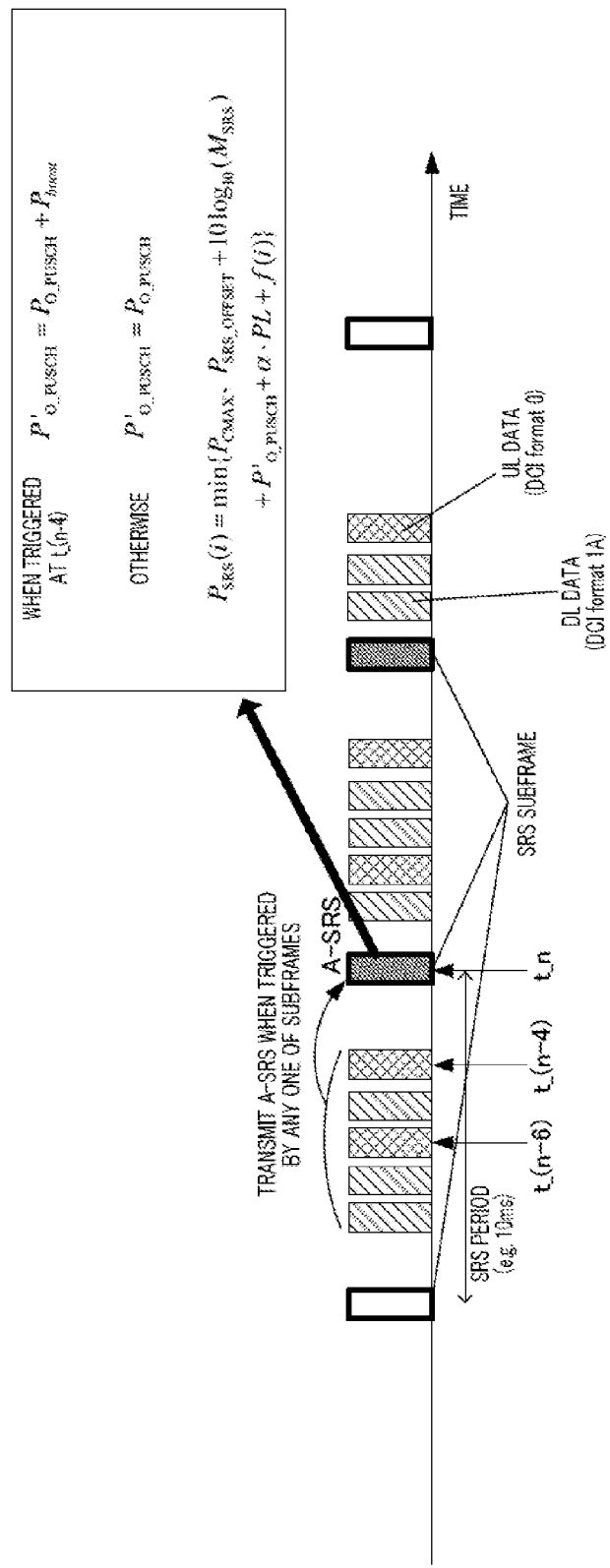
FIG. 8 is a diagram showing processing of transmission power control according to Embodiment 4 of the present invention.

For example, in FIG. 8, within the mapping period (10 ms) of the common SRS resources, the uplink resource assignment control information (DCI format 0) is transmitted in subframes of t_(n−6) and t_(n−4). In addition, in FIG. 8, t_(n—6) indicates a subframe located six subframes before t_n, and t_(n−4) indicates a subframe located four subframes before t_n.

That is, in FIG. 8, uplink transmission data corresponding to the uplink resource assignment control information (DCI) transmitted in t_(n−6) is transmitted in t_(n−2) after four subframes from t_(n−6). Similarly, uplink transmission data corresponding to the uplink resource assignment control information (DCI) transmitted in t_(n−4) is transmitted in t_n after four subframes from t_(n−4). That is, a subframe in which the uplink transmission data corresponding to the uplink resource assignment control information (DCI) transmitted in t_(n−4) is transmitted, and the common SRS subframe are the same.

Therefore, in FIG. 8, when trigger information to trigger the transmission of A-SRS is included in the uplink resource assignment control information (DCI) transmitted in t_(n−4), transmission controlling section 206 uses $P'_{O\_PUSCH}$, which is obtained by giving the offset value $P_{boost}$ to $P_{O\_PUSCH}$, instead of $P_{O\_PUSCH}$ shown in Equation 3. Meanwhile, in FIG. 8, when trigger information to trigger the transmission of A-SRS is included in the uplink resource assignment control information (DCI) transmitted in t_(n−6) ("otherwise" shown in FIG. 8), transmission controlling section 206 uses $P_{O\_PUSCH}$ shown in Equation 3 as is.

In addition, when triggering A-SRS transmission so that the A-SRS can reach the receiving antenna of the picocell for terminal 200 served by the picocell or when triggering A-SRS transmission so that the A-SRS can reach the receiving antenna of the macrocell, base station 100 appropriately selects the timing of the uplink resource assignment control information including the trigger information.

The effects obtained in this manner will be described below.

Examples of a situation where an error occurs in TPC control (error of transmission power actually transmitted by the terminal with respect to target transmission power; hereinafter, referred to as TPC error) include a case where the TPC error becomes large as the transmission time interval of the uplink signal becomes long. This is because the temperature of the power amplifier (PA) of the terminal changes with time and the amplification characteristics of the PA changes with time. For this reason, the TPC error becomes large as the transmission time interval of the uplink signal becomes long.

In contrast, in the present embodiment, terminal 200 increases and transmits the transmission power of A-SRS when the transmission subframe of uplink transmission data corresponding to the uplink resource assignment control information included in the DCI (DCI format 0) including the trigger information is the same as the common SRS subframe. For this reason, uplink transmission data always exists immediately before the transmission of A-SRS that is transmitted with large transmission power. Therefore, since the transmission time interval between the uplink transmission data and A-SRS (that is, during a time period for PA to be turned off) becomes a minimum, the TPC error can be made small.

In this manner, according to the present embodiment, the transmission power used for transmission of a reference signal can be flexibly set by avoiding an increase in the TPC error which occurs when transmitting an A-SRS so that the A-SRS can reach the receiving antenna of a macrocell, while avoiding an increase in the number of bits used in the trigger information of transmission of a reference signal. As a result, the channel quality can be measured in the macrocell without influence from a difference in distance attenuation. Thus, it is possible to avoid delays in switching between the transmission and reception points and to reliably perform switching between the transmission and reception points. In addition, it is possible to avoid throughput degradation caused by delays in switching between the transmission and reception points, which would have occurred otherwise.

In addition, although the case where the value of f(i) in Equation 3 is updated by applying the value of the TPC command as is even when the transmission power of A-SRS is increased has been described in the present embodiment, the present invention is not limited to this case. For example, when updating the value of f(i), the value of the TPC command may be changed. More specifically, terminal 200 may set transmission power by replacing the TPC command [−1, 0, +1, +3] indicated in advance with [−N, 0, +N, +3N], which is obtained by multiplying [−1, 0, +1, +3] by a predetermined integer N, for the uplink resource assignment information in which the trigger information of A-SRS is included. Alternatively, terminal 200 may set transmission power by replacing the maximum value of the TPC command with [−1, 0, +1, +L] using the control value L indicated in advance. Accordingly, as in the present embodiment, transmission power used for uplink data transmission can be set to be high, and a difference of transmission power between A-SRS and the uplink data can be reduced. As a result, it is possible to keep the TPC error low.

Figure 9:
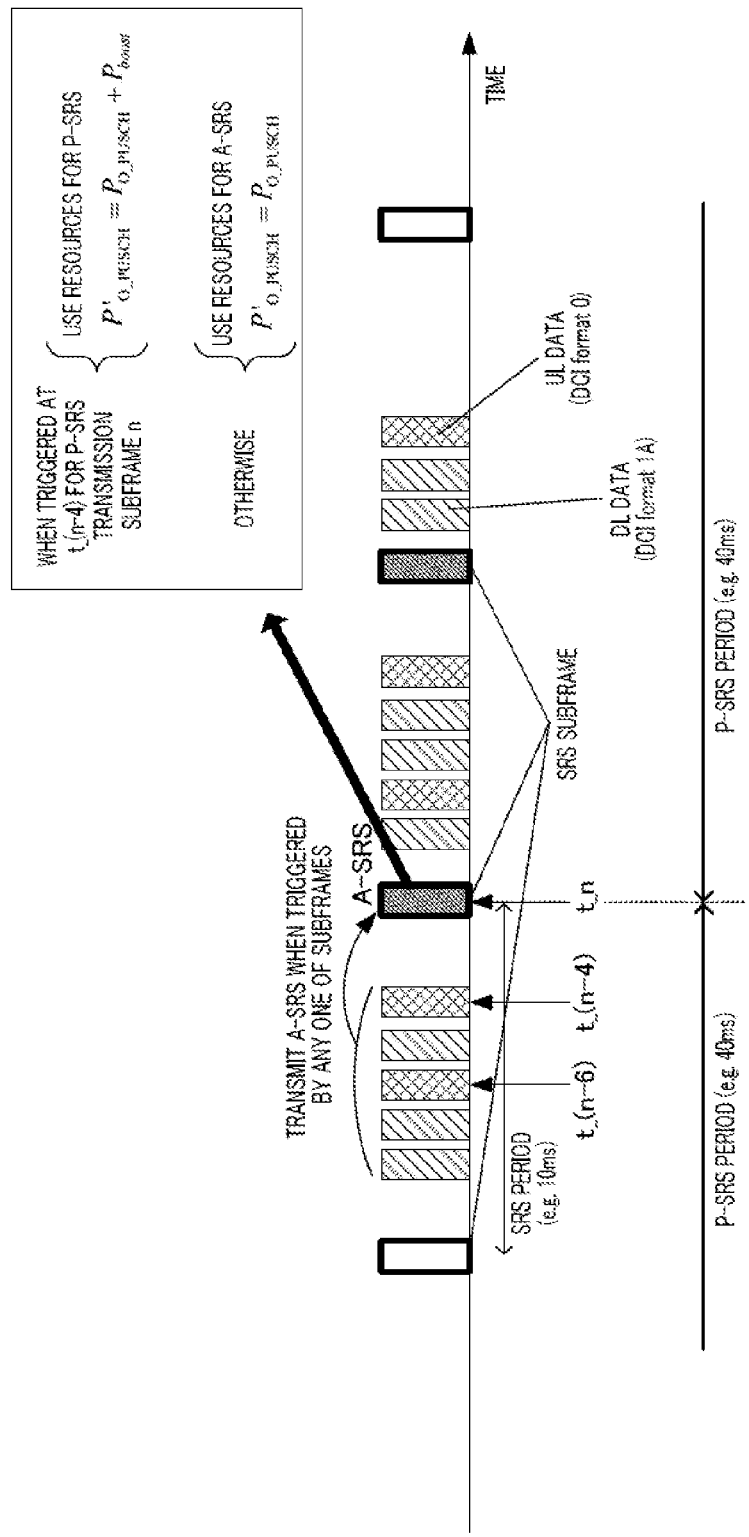
FIG. 9 is a diagram showing processing of another transmission power control according to Embodiment 4 of the present invention.

In addition, similarly, when distinguishing the transmission power control method according to the subframe in which DCI for triggering an A-SRS is transmitted, terminal 200 may further determine the transmission timing of P-SRS. Specifically, as shown in FIG. 9, only when an A-SRS corresponding to the same timing as the transmission timing of P-SRS is triggered, terminal 200 may apply the transmission power control according to Equation 3 for the uplink transmission data and apply the transmission power control in which the offset value shown in Equation 4 is given, for A-SRS, and may use the resources for P-SRS for A-SRS. That is, when a P-SRS transmitted periodically and an A-SRS transmitted only when trigger information is received are transmitted at the same transmission timing, terminal 200 may transmit the A-SRS with transmission power increased by a predetermined value in the resources for the P-SRS. That is, terminal 200 may increase the transmission power only for an A-SRS that overwrites a P-SRS. Here, the resources for P-SRS are resources carefully designed so that interference between terminals does not occur in the macrocell. Therefore, since A-SRS is transmitted with transmission power reaching the receiving antenna of the macrocell using the resources for P-SRS in a situation where A-SRS to reach the receiving antenna of the macrocell is required, that is, a situation where it is difficult to predict interference affecting other picocells on the base station side, base station 100 can perform high-quality channel quality measurement.

Embodiment 5

The operations of base station 100 and terminal 200 according to the present embodiment will be described. Here, a case will be described in which base station 100 uses DCI format 0 as a format of uplink resource assignment control information and uses DCI format 1A as a format of downlink resource assignment control information.

In addition, in the present embodiment, trigger information of downlink CSI reporting (reporting request of downlink CSI) is included in uplink resource assignment information. In addition, base station 100 can instruct terminal 200 to transmit only downlink CSI reporting without assignment of uplink transmission data.

A specific method of instructing only downlink CSI reporting will be described. When reporting the uplink resource assignment control information to terminal 200 using DCI format 0, base station 100 can instruct only downlink CSI reporting by setting the CQI regarding bit to "1," setting $I_{MCS}$=29 in a field indicating the modulation method and the coding rate, and setting the number of assigned resource blocks $N_{PRB}$ to be equal to or less than 4 ($N_{PRB} \leq 4$). In addition, setting the CQI request bit to 1 means requesting the reporting of downlink CSI. In addition, setting a field $I_{MCS}$ indicating the modulation method and the coding rate to 29 usually corresponds to resource assignment when Redundancy Version (RV) of retransmission data is set to 1, and setting the number of assigned resource blocks NPRB to be equal to or less than 4 is usually used to assign a smaller amount of data. Here, matching a combination of both with setting the CQI request bit to 1 leads to an operation to instruct only downlink CSI reporting without assigning uplink data.

Alternatively, when indicating the uplink resource assignment control information to terminal 200 using DCI format 4, base station 100 can instruct only downlink CSI reporting by setting the CQI requesting bit to "1," using a single transport block (TB), setting $I_{MCS}$=29 in the field indicating the modulation method and the coding rate for the used TB, and setting the number of assigned resource blocks $N_{PRB}$ to be equal to or less than 4 ($N_{PRB} \leq 4$).

In the present embodiment, base station 100 transmits the assignment control information (downlink resource assignment control information or uplink resource assignment control information), which includes trigger information, to terminal 200 within the mapping period (for example, 10 ms) of the common SRS resources. Accordingly, it is possible to cause terminal 200 to transmit an A-SRS in the first common SRS subframe at or after the transmission timing of the trigger information.

In this case, when terminal 200 has been indicated to perform downlink CSI reporting for a plurality of the transmission and reception points and the format identification information of DCI indicates DCI format 0, transmission controlling section 206 of terminal 200 determines the method of controlling the transmission power of A-SRS according to whether or not only downlink CSI reporting has been instructed without assignment of uplink transmission data by the DCI.

Figure 10:
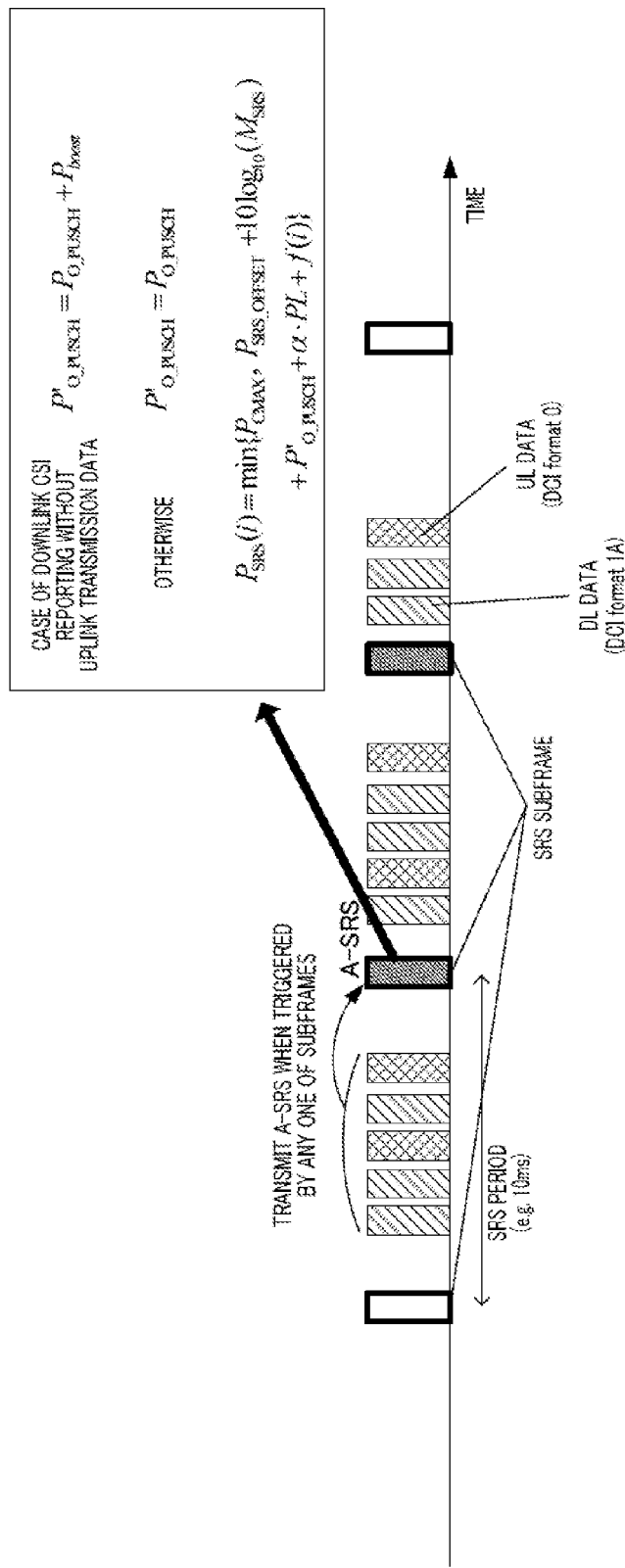
FIG. 10 is a diagram showing processing of transmission power control according to Embodiment 5 of the present invention.

Specifically, if trigger information of A-SRS is included in the DCI in a case where only downlink CSI reporting is instructed without assignment of uplink transmission data by the DCI, transmission controlling section 206 applies the transmission power control according to Equation 3 to the downlink CSI reporting and also applies a transmission power control method obtained by giving the offset value shown in Equation 4 to the transmission power control according to Equation 3, for A-SRS (refer to FIG. 10). That is, terminal 200 transmits an A-SRS with transmission power increased by a predetermined value (that is, transmission power allowing the A-SRS to reach the macrocell) when the reporting of each downlink CSI between a plurality of cells and terminal 200 is requested in the downlink CSI reporting request indicated from base station 100 and only the trigger information of A-SRS and the reporting request of downlink CSI are included in DCI of DCI format 0 (format for uplink assignment).

For example, when assignment of uplink transmission data and an instruction of the downlink CSI direction are included in the DCI, the data size (number of bits) of the uplink data signal corresponding to the DCI becomes relatively large. For this reason, in order to transmit an A-SRS in the same subframe as the uplink data signal having a relatively large number of bits, a process such as reducing the data rate is needed to ensure the resources for the A-SRS.

Meanwhile, when only the instruction of the downlink CSI direction is included in the DCI without assignment of uplink transmission data, the data size (number of bits) of the uplink data signal corresponding to the DCI becomes relatively small. For this reason, when transmitting an A-SRS in the same subframe as the uplink signal (downlink CSI) having a relatively small number of bits, a process such as significantly reducing the data rate for the uplink signal having a relatively small number of bits is not needed even if the resources for A-SRS are ensured. Therefore, a possibility that the uplink signal and A-SRS can be transmitted from terminal 200 to base station 100 without retransmission becomes high. Thus, channel quality measurement can be accurately performed in base station 100 without reducing the throughput of the uplink. In addition, base station 100 can obtain the channel quality of the uplink and downlink simultaneously by making the reporting of downlink CSI and the request for transmission of A-SRS for the uplink channel quality measurement included in the same DCI.

In addition, as in Embodiment 1, it is possible to set the transmission power flexibly for transmission of a reference signal while avoiding an increase in the number of bits used in the trigger information of transmission of the reference signal. As a result, the channel quality can be measured in the macrocell without influence from a difference in distance attenuation. Thus, it is possible to avoid delays in switching between the transmission and reception points and to reliably perform switching between the transmission and reception points. In addition, it is possible to avoid throughput degradation caused by delays in switching between the transmission and reception points, which would have occurred otherwise.

In addition, in the present embodiment, in the same manner as when an A-SRS (that is, a signal for the channel quality measurement in uplink) is transmitted taking into consideration whether or not the signal reaches the receiving antenna of the macrocell in the uplink, it is also possible to perform downlink CSI reporting on the resources in the downlink by performing the channel quality measurement limited to only the resources associated with the macrocell in the terminal 200. Thus, it is possible to avoid delays in switching between the transmission and reception points for not only the uplink but also for the downlink and thereby to avoid throughput degradation.

Other Embodiments (1) In each of the embodiments described above, the parameters defining the SRS resources include cyclic shift, comb, the number of RBs (or bandwidth), RB position (or SRS frequency domain starting position in the frequency), frequency hopping pattern, the number of antennas, and the like. Comb herein refers to a signal pattern in signals that has a comb-tooth shaped transmission waveform in the frequency domain (e.g., waveform having only even numbered subcarriers in the signal component), which is generated when single carrier signals are repeatedly transmitted. For example, when single-carrier signals are repeatedly transmitted twice, a waveform of alternate subcarriers is formed, so that comb number 0 represents an even numbered subcarrier and comb number 1 represents an odd numbered subcarrier. Meanwhile, comb is called the number of repetitions in some cases. P-SRS is called "Type0 SRS" in some cases, and A-SRS is called "Type1 SRS" in some cases.

(2) In each of the embodiments, the frequency domain starting position, bandwidth, cyclic shift and comb number are used as the basic configuration parameters of each SRS resource configuration, but the parameters are not limited to these parameters and a parameter other than these parameters may be included in the basic configuration parameters for SRS resources.

(3) In each of the embodiments, terminal 200 is configured to transmit A-SRS in a common SRS subframe. However, the present invention is not limited to this configuration, and terminal 200 may be configured to transmit A-SRS in an individual SRS subframe.

(4) In addition, even if other DCI formats excluding the DCI formats 0 and 1A are used as DCI formats of uplink and downlink, the same effect as in each of the embodiments described above can be obtained.

(5) SRS transmitted from terminal 200 may be used for downlink weighting (or precoding) control of each antenna and/or the like other than for estimation of a propagation path condition, uplink MSC configuration, frequency scheduling, and weighting (directivity) control of each antenna performed by base station 100. In this case, SRS resources for the uplink MCS configuration, frequency scheduling and weighting control of antennas, and SRS resources for the downlink weighting control of antennas may be configured for different DCI formats. Accordingly, it is possible to trigger A-SRS for each application without increasing the indicating bits.

(6) In each of the embodiments, a description has been provided with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna including a plurality of antennas and/or the like.

For example, how many physical antennas are included in the antenna port is not defined in LTE, but the antenna port is defined as the minimum unit allowing the base station to transmit different reference signals in 3GPP LTE.

In addition, an antenna port may be specified as a minimum unit to be multiplied by a precoding vector weighting.

(7) In the foregoing embodiments, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, the drawings, and the abstract included in Japanese Patent Application No. 2011-144111, filed on Jun. 29, 2011, is incorporated herein by reference in its entirety.

INDUSTRIAL APPLICABILITY

The present invention is useful in that transmission power used for transmission of a reference signal can be flexibly set while avoiding an increase in the number of bits used in the request for transmission of the reference signal.

REFERENCE SIGNS LIST

100 Base station
101 Configuration section
102, 103 Coding and modulation section
104 Transmission processing section
105, 208 RF transmitting section
106, 201 Antenna
107, 202 RF receiving section
108, 203 Reception processing section
109 Data receiving section
110 SRS receiving section
200 Terminal
204 Reference signal generating section
205 Data signal generating section
206 Transmission controlling section
207 Transmission signal forming section

The invention claimed is:
1. A terminal apparatus comprising:
a receiving section that receives a request for reporting of downlink channel state information (CSI), and downlink control information (DCI) including a request for transmission of a sounding reference signal (SRS) in one of a plurality of DCI formats, the plurality of DCI formats including DCI format 0 that includes uplink assignment information and DCI format 1A that includes downlink assignment information; and
a transmitting section that transmits the SRS with transmission power that is set based on the reporting request, a DCI format in which the transmission request is included, and a parameter for setting an initial value of a transmission power control (TPC) command used for calculating the transmission power, the parameter being indicated in a random access procedure, the parameter for a terminal served by a macrocell being larger than a previously set threshold and the parameter for a terminal served by a picocell being equal to or less than the threshold, wherein:
the transmitting section transmits the SRS with first transmission power when the reporting request indicates a request for reporting of downlink CSI between the terminal apparatus and each of a plurality of base stations, the transmission request is included in the DCI format 1A, and the parameter is equal to or less than a previously set threshold, and the transmitting section transmits the SRS with the second transmission power when the reporting request indicates a request for reporting of downlink CSI between the terminal apparatus and a single base station, when the transmission request is included in the DCI format 0, or when the parameter is greater than the previously set threshold; and
the first transmission power is larger than the second transmission power.

2. The terminal apparatus according to claim 1, wherein:
the SRS is transmitted in a first SRS transmission subframe after a predetermined interval from reception of the transmission request; and
the transmitting section transmits the SRS with the first transmission power when the reporting request indicates a request for transmission of downlink CSI between the terminal apparatus and each of the plurality of base stations, the transmission request is included in the DCI format 1A, the parameter is equal to or less than the threshold, and a transmission subframe for uplink data corresponding to uplink assignment information included in the DCI format 1A is the same as the SRS transmission subframe.

3. The terminal apparatus according to claim 2, wherein, when the SRS to be transmitted upon receipt of the transmission request and another SRS to be transmitted in a predetermined period are transmitted in the same subframe, the transmitting section transmits the SRS with a resource used for the other SRS and the first transmission power.

4. The terminal apparatus according to claim 1, wherein the transmitting section transmits the SRS with the first transmission power when the reporting request indicates a request for reporting of downlink CSI between the terminal apparatus and each of the plurality of base stations, the parameter is equal to or less than the threshold, and only the transmission request and the reporting request are included in the DCI format 1A.

5. The terminal apparatus according to claim 1, wherein the first transmission power is power obtained by increasing the second transmission power by a predetermined value.

6. The terminal apparatus according to claim 1, wherein:
the plurality of base stations include a macro base station and a plurality of pico base stations disposed in a coverage area of the macro base station;
the first transmission power is power that is set to transmit the SRS at least to the macro base station; and
the second transmission power is power that is set to transmit the SRS to a pico base station, among the plurality of pico base stations, that covers a cell to which the terminal apparatus belongs.

7. A base station apparatus, comprising:
a transmitting section that transmits, to a terminal apparatus, a request for reporting of downlink channel state information (CSI), and downlink control information (DCI) including a request for transmission of a sounding reference signal (SRS) in one of a plurality of DCI formats, the plurality of DCI formats including DCI format 0 that includes uplink assignment information and DCI format 1A that includes downlink assignment information; and
a receiving section that receives the SRS transmitted with transmission power that is set based on the reporting request, a DCI format in which the transmission request is included, and a parameter for setting an initial value of transmission power control (TPC) command used for calculating the transmission power, the parameter being indicated in a random access procedure, the parameter for a terminal served by a macrocell being larger than a previously set threshold and the parameter for a terminal served by a picocell being equal to or less than the threshold, wherein:
first transmission power is set for the SRS when the reporting request indicates a request for reporting of downlink CSI between the terminal apparatus and each of a plurality of base stations, the transmission request is included in the DCI format 1A, and the parameter is equal to or less than the threshold; and
the second transmission power is set for the SRS when the reporting request indicates a request for reporting of downlink CSI between the terminal apparatus and a single base station, when the transmission request is included in the DCI format 0, or when the parameter is greater than the threshold; and
the first transmission power is larger than the second transmission power.

8. A transmission method comprising:
receiving a request for reporting of downlink channel state information (CSI), and downlink control information (DCI) including a request for transmission of a sounding reference signal (SRS) in one of a plurality of DCI formats, the plurality of DCI formats including DCI format 0 that includes uplink assignment information and DCI format 1A that includes downlink assignment information; and
transmitting the SRS with first transmission power when the reporting request indicates a request for reporting of downlink CSI between the terminal apparatus and each of a plurality of base stations, the transmission request is included in the DCI format 1A, and a parameter for setting an initial value of transmission power control (TPC) command used for calculating the transmission power is equal to or less than a previously set threshold, the parameter being indicated in a random access procedure, the parameter for a terminal served by a macrocell being larger than a previously set threshold and the parameter for a terminal served by a picocell being equal to or less than the threshold, and
transmitting the SRS with second transmission power when the reporting request indicates a request for reporting of downlink CSI between the terminal apparatus and a single base station, when the transmission request is included in the DCI format 0, or when the parameter is greater than the threshold, wherein
the first transmission power is larger than the second transmission power.

9. A transmission power setting method, comprising:
transmitting, to a terminal apparatus, request for reporting of downlink channel state information (CSI), and downlink control information (DCI) including a request for transmission of a sounding reference signal (SRS) in one of a plurality of DCI formats, the plurality of DCI formats including DCI format 0 that includes uplink assignment information and DCI format 1A that includes downlink assignment information; and
receiving the SRS transmitted with transmission power that is set based on the reporting request, a DCI format in which the transmission request is included, and a parameter for setting an initial value of transmission power control (TPC) command used for calculating the transmission power the parameter being indicated in a random access procedure, the parameter for a terminal served by a macrocell being larger than a previously set threshold and the parameter for a terminal served by a picocell being equal to or less than the threshold, wherein
first transmission power is set for the SRS when the reporting request indicates a request for reporting of downlink CSI between the terminal apparatus and each of a plurality of base stations, the transmission request is included in the DCI format 1A, and the parameter is equal to or less than the threshold; and second transmission power is set for the SRS when the reporting request indicates a request for reporting of downlink CSI between the terminal apparatus and a single base station, when the transmission request is included in the DCI format 0, or when the parameter is greater than the threshold, wherein the first transmission power is larger than the second transmission power.

\* \* \* \* \*